(12) United States Patent
Odoi et al.

(10) Patent No.: US 8,172,303 B2
(45) Date of Patent: May 8, 2012

(54) LINK MECHANISM

(75) Inventors: Kozo Odoi, Hiroshima (JP); Minoru Okamura, Hiroshima (JP); Tomoaki Matsunobu, Hiroshima (JP)

(73) Assignee: Webasto AG (DE)

( * ) Notice: Subject to any disclaimer, the term of this patent is extended or adjusted under 35 U.S.C. 154(b) by 887 days.

(21) Appl. No.: 12/294,984

(22) PCT Filed: Mar. 26, 2007

(86) PCT No.: PCT/JP2007/056265
§ 371 (c)(1),
(2), (4) Date: Sep. 29, 2008

(87) PCT Pub. No.: WO2007/116700
PCT Pub. Date: Oct. 18, 2007

(65) Prior Publication Data
US 2010/0223851 A1    Sep. 9, 2010

(30) Foreign Application Priority Data
Mar. 28, 2006 (JP) .................................. 2006-088387

(51) Int. Cl.
*B60J 7/00* (2006.01)
(52) U.S. Cl. .................................................. 296/107.08
(58) Field of Classification Search .............. 296/107.08
See application file for complete search history.

(56) References Cited

U.S. PATENT DOCUMENTS

| | | | |
|---|---|---|---|
| 2,352,298 A * | 6/1944 | Wallace | 246/219 |
| 4,572,572 A | 2/1986 | Nakamura et al. | |
| 5,746,470 A | 5/1998 | Seel et al. | |
| 7,806,458 B2 * | 10/2010 | Meinert | 296/107.08 |
| 2002/0130532 A1 * | 9/2002 | Halbweiss et al. | 296/136 |
| 2009/0102228 A1 * | 4/2009 | Hinrichs et al. | 296/107.08 |

FOREIGN PATENT DOCUMENTS

| | | |
|---|---|---|
| DE | 199 60 905 C1 | 5/2001 |
| JP | 58-116321 A | 7/1983 |

(Continued)

OTHER PUBLICATIONS

International Search Report for PCT/JP2007/056265 dated Jun. 19, 2007.
The Extended European Search Report dated Dec. 21, 2010; Application No. / Patent No. EP07739703.2-2421 / 2006577 PCT/JP2007056265.

*Primary Examiner* — Lori Lyjak
(74) *Attorney, Agent, or Firm* — Studebaker & Brackett PC; Donald R. Studebaker (57) ABSTRACT

A link mechanism capable of setting any desirable speed of opening/closing a lid during a series of the opening/closing operation and capable of exerting a strong driving force is provided. A lid (6) is attached to a lid bracket (31). The lid bracket (31) is pivotally connected to a driving lever (14) and a coupled-driving lever (15) with which the lid (6) is opened or closed. The driving lever (14) is provided with a cam having an elongated hole (34), into which a driving pin (36) provided to a sector gear (13) is fitted. The sector gear (12) is driven by a motor through a pinion (22). According to rotation of the sector gear (13), the driving pin (36) moves in the elongated hole (34) and drives the driving lever (14). Since the distance between the center of the sector gear (13) and the driving pin (36) is larger than the radius of the pinion (22), such mechanism exerts a strong driving force.

23 Claims, 8 Drawing Sheets

FOREIGN PATENT DOCUMENTS

| | | |
|---|---|---|
| JP | 06-75826 | 10/1994 |
| JP | 2003-285646 | 10/2003 |
| WO | 2004/035338 A1 | 4/2004 |
| WO | WO 2007/114161 * | 11/2007 |

* cited by examiner

LINK MECHANISM

TECHNICAL FIELD

The present invention relates to link mechanisms, and particularly relates to a link mechanism for opening and closing a lid.

BACKGROUND ART

Various studies have been conducted on vehicles provided with retractable roofs in which front roofs and rear roofs are movable. In such a vehicle, while the front roof covering the top of the vehicle interior and the rear roof covering the rear of the vehicle interior are open, these roofs are folded and housed in a storage space at the rear of the vehicle and the storage space is covered with a lid. On the other hand, under conditions of low outside temperatures or rainy weather, the two roofs are closed to fully cover the top of the vehicle interior so that the vehicle interior is sealed.

A mechanism for opening and closing such a retractable roof is disclosed in, for example, Patent Document 1, and a four point hinge mechanism is generally used. The lid of the roof storage space is opened or closed by an additionally-provided opening/closing mechanism. As a driving source for the opening/closing mechanism, a hydraulic cylinder has been conventionally used in many cases. However, the hydraulic cylinder has a lot of energy losses such as a loss in an excess discharge amount of a pump, a loss in system mass, and a loss in an excess liquid amount of a control valve, and therefore electric motors are currently used. In Patent Document 1, a hydraulic cylinder is used as a mechanism for opening and closing a roof but it is not specifically explained what opens and closes a lid (a tailboard) of a storage space.
Patent Document 1: Japanese Unexamined Patent Publication No. 8-244465

DISCLOSURE OF INVENTION

Problems that the Invention is to Solve

To drive a four point hinge mechanism by an electric motor, a method in which a gear is fixed to a driving lever of the four point hinge mechanism so that the gear is driven by an electric motor through a pinion can be employed.

Since the movement of the driving lever is regulated by rotation of the gear in this case, movement, especially the speed, cannot be arbitrarily set because of a small space for housing the link mechanism. Specifically, it is preferable for safety that the movement is set slow at the start of opening/closing operation and is set fast in the middle of the opening/closing operation, for example. However, with the above-mentioned method, it is very difficult to perform such operation (i.e., to variously set the speed). In addition, in the above method, driving power for driving the driving lever is determined by the radius of the pinion, and thus it is difficult to increase the driving power. Further, a latch mechanism for latching the lid when the lid is closed is conventionally provided in addition to the link mechanism. In this case, a large number of components and a large footprint are needed, thus making it very difficult to design a link mechanism and a latch mechanism.

It is therefore an object of the present invention to provide a link mechanism with high driving power in which the opening/closing speed during a series of operation from opening to closing or closing to opening of a lid is allowed to be arbitrarily set.

Means of Solving the Problems

To solve the problems, a first link mechanism according to the present invention is a link mechanism for opening and closing a lid and includes: a base; a driving lever and a coupled-driving lever, one end of each of the levers being pivotally connected to the base at a different position from each other; and a lid to which the other end of each of the levers is connected. The driving lever is provided with a cam which has one of a groove and an elongated hole to accept a pin. The pin is provided to a gear which is driven by a motor through a pinion. A distance between the central axis of the gear and the pin is larger than the radius of the pinion. The driving lever is driven by the pin which is configured to move in one of the groove and the elongated hole. The lid herein is a panel member for covering the top of the vehicle interior and opening/closing the interior. Examples of a lid include a movable roof serving as a ceiling of a vehicle interior, a trunk lid for a trunk room, and a lid for a storage space for storing a retractable roof. The cam serves as an intermediary for translating a movement of a pin into a movement of a driving lever.

A second link mechanism according to the present invention is a link mechanism for opening and closing a lid and includes: a base; a driving lever and a coupled-driving lever, one end of each of the levers being pivotally connected to the base at a different position from each other; and a lid to which the other end of each of the levers is connected. The driving lever is provided with one of a groove and an elongated hole to accept a pin. The pin is provided to a gear which is driven by a motor through a pinion. A distance between the central axis of the gear and the pin is larger than the radius of the pinion. The driving lever is driven by the pin which is configured to move in one of the groove and the elongated hole.

With the foregoing configurations, the position and shape of the groove or the elongated hole are set at desired position and shape so that the speed variation in opening/closing operation of the lid is allowed to be set at a desired variation. In addition, since the distance between the central axis of the gear and the pin is larger than the radius of the pinion, a driving lever is driven with a high torque.

One of the groove and the elongated hole is preferably formed in a manner extending away from a portion of the driving lever at which the driving lever is pivotally connected to the base.

Preferably, one of the groove and the elongated hole has a non-driving section which is formed generally parallel to a moving track of the pin, and the driving lever is not driven even when the pin moves in the non-driving section. The term "generally parallel" herein is not necessarily "parallel" in a strict sense and has a margin within which a pin moves smoothly without causing any practical problems.

Preferably, the non-driving section is provided at least at one end of one of the groove and the elongated hole, and when the pin is located in the non-driving section, the lid is kept in a closed state.

The non-driving section is preferably provided in one of the groove and the elongated hole at one end thereof located closer to a portion of the driving lever at which the driving lever is pivotally connected to the base.

Preferably, the gear drives the lid from an open state to a closed state through rotation in one direction, and with the rotation in one direction of the gear, the pin moves in the non-driving section provided at the end of one of the groove and the elongated hole during which an engaging member provided to the gear engages an engagement-object member provided to the lid. With this structure, the link mechanism also serves as a latch mechanism for a lid, thus reducing the number of components.

The gear is preferably a sector gear.

The engaging member is preferably an end portion of the sector gear which is formed in the shape of a hook.

EFFECTS OF THE INVENTION

A pin provided to a gear is fitted into, and moves in, a groove or an elongated hole which is arbitrarily set at any position in any shape, thereby driving a driving lever. Thus, the speed of opening/closing a lid is allowed to be adjusted to a speed with a desired variation by arbitrarily setting the position and shape of the groove or elongated hole. In addition, the distance between the central axis of the gear and the pin is larger than the radius of a pinion, thereby driving the driving lever with a high torque.

DESCRIPTION OF NUMERALS 6 lid
11 motor bracket
12 motor
13 sector gear
14, 14' driving lever
15 coupled-driving lever
21 main bracket
22 pinion
23 hook portion (engaging member)
31 lid bracket
32 engaging pin (engagement-object member)
33, 33' cam having an elongated hole
34 elongated hole
35 elongated hole
36 driving pin
37 non-driving section
41 connecting bolt for a sector gear
55 pivotally-connecting bolt

BEST MODE FOR CARRYING OUT THE INVENTION

Hereinafter, preferred embodiments of the present invention will be described with reference to the accompanying drawings, in which each member with substantially the same function will be identified by the same reference numeral for the sake of simplicity of description.

Embodiment 1

Figure 1:
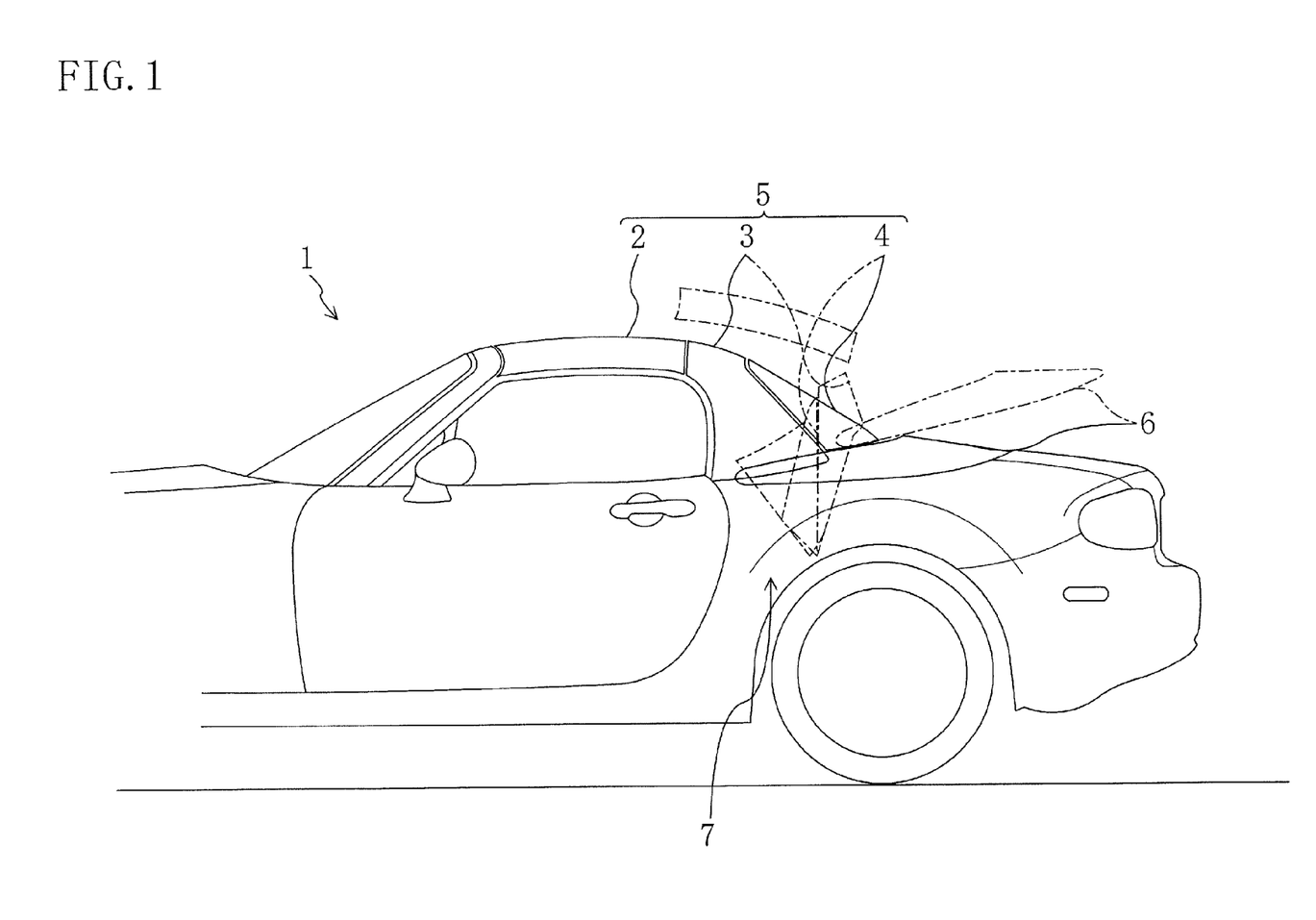
FIG. 1 Schematic side view of a rear section of a running vehicle having a retractable roof.
Figure 2:
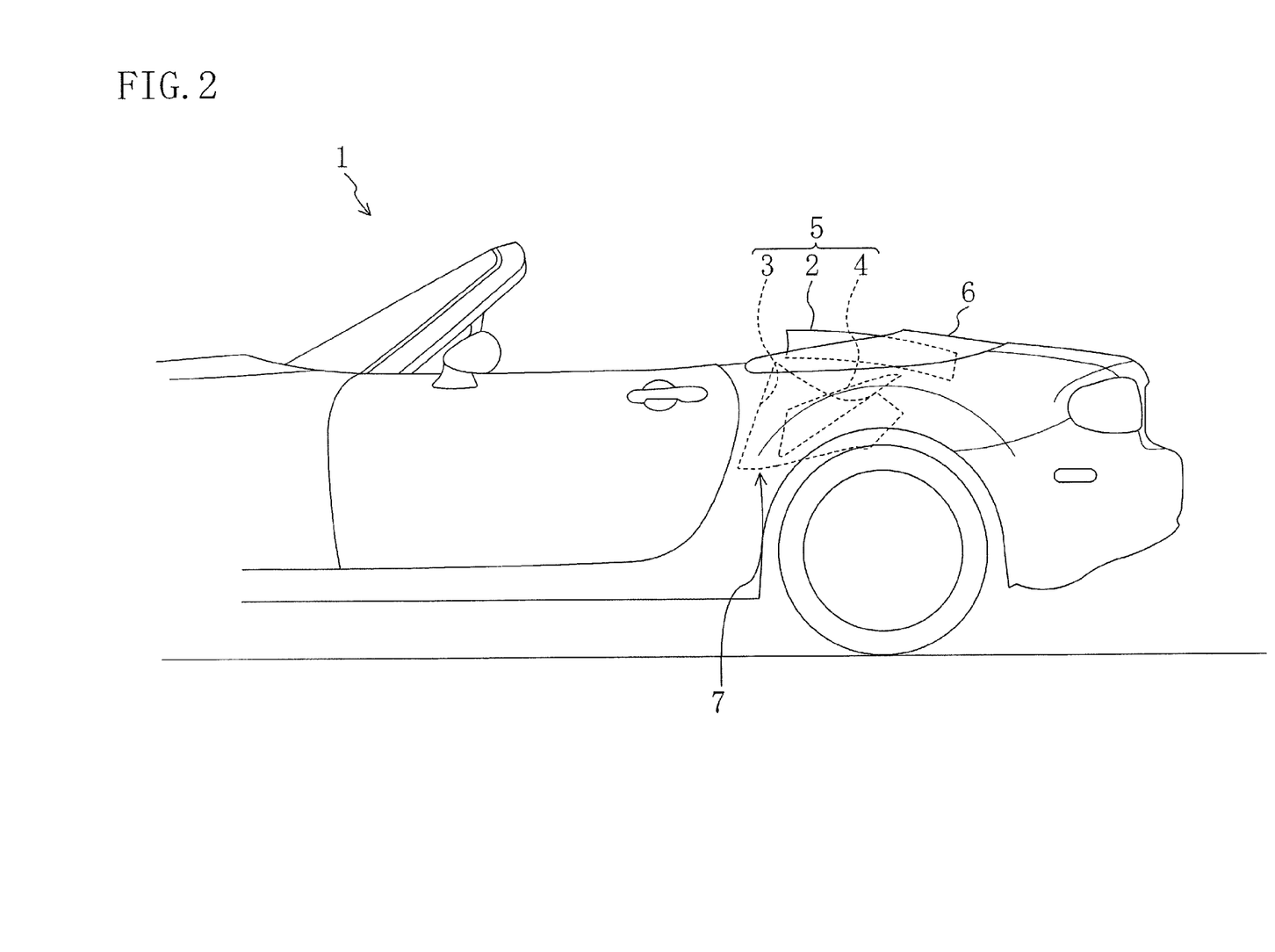
FIG. 2 Another schematic side view of a rear section of a running vehicle having a retractable roof.

FIGS. 1 and 2 are schematic side views of a running vehicle (passenger car) 1 having a retractable roof 5.

The retractable roof 5 includes a front roof 2 as a ceiling of a passenger compartment, a rear roof 3 at the rear of the passenger compartment, and a rear window 4. In a fully-open state shown in FIG. 2, the front roof 2, the rear roof 3, and the rear window 4 are folded and housed in a storage space 7. In FIG. 1, the fully-closed retractable roof 5 is indicated by the solid line, whereas the half-open (half-closed) retractable roof 5 is indicated by the dash-dotted line. While the retractable roof 5 is fully open or fully closed, the storage space 7 is covered with a lid 6. The retractable roof 5 and the lid 6 are opened and closed by a link mechanism, which is not shown in FIGS. 1 and 2 because depiction of the link mechanism makes the drawings complicated and less understandable.

Figure 6:
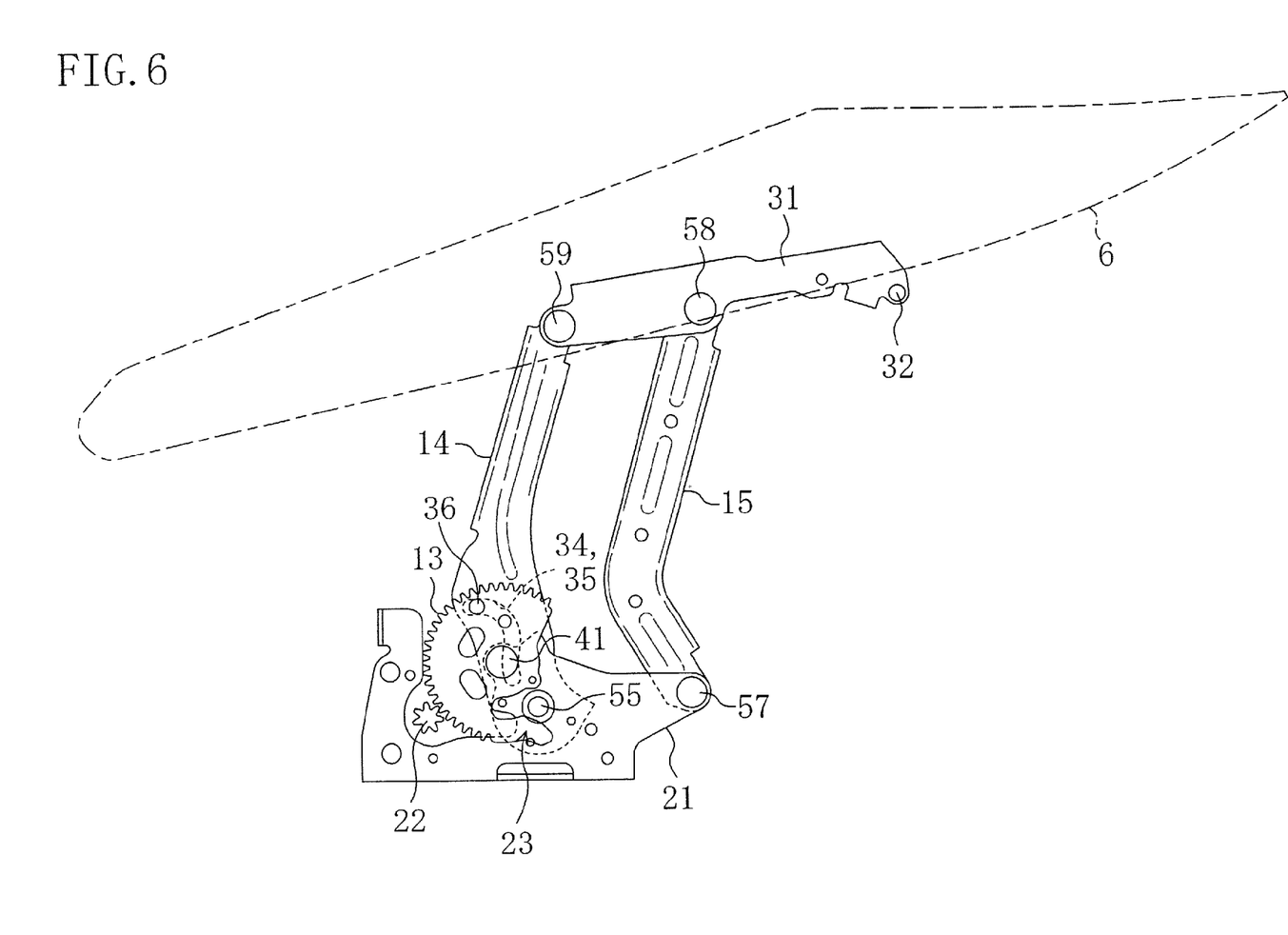
FIG. 6 Schematic side view of a link mechanism for opening/closing a lid when the lid is fully open.

FIG. 6 schematically shows a side view of the lid 6 in a fully-open state by a link mechanism for opening and closing the lid 6. This link mechanism is a so-called four point hinge mechanism for opening and closing the lid 6 using a motor 12 as a driving source. The link mechanism includes: a main bracket 21 as a base; a lid bracket 31 fixed to the lid 6; a driving lever 14 whose both ends are pivotally connected to the main bracket 21 and the lid bracket 31 with pivotally-connecting bolts 55 and 59, respectively, to operate the link mechanism; and a coupled-driving lever 15 whose both ends are pivotally connected to the main bracket 21 and the lid bracket 31 with pivotally-connecting bolts 57 and 58, respectively, to regulate the opening/closing range and opening/closing operation of the lid 6. The main bracket 21 is fixed to the bottom of the storage space 7 to be fixed to the vehicle body. In this embodiment, the lid 6 and the lid bracket 31 may be collectively referred to as a lid.

Figure 3:
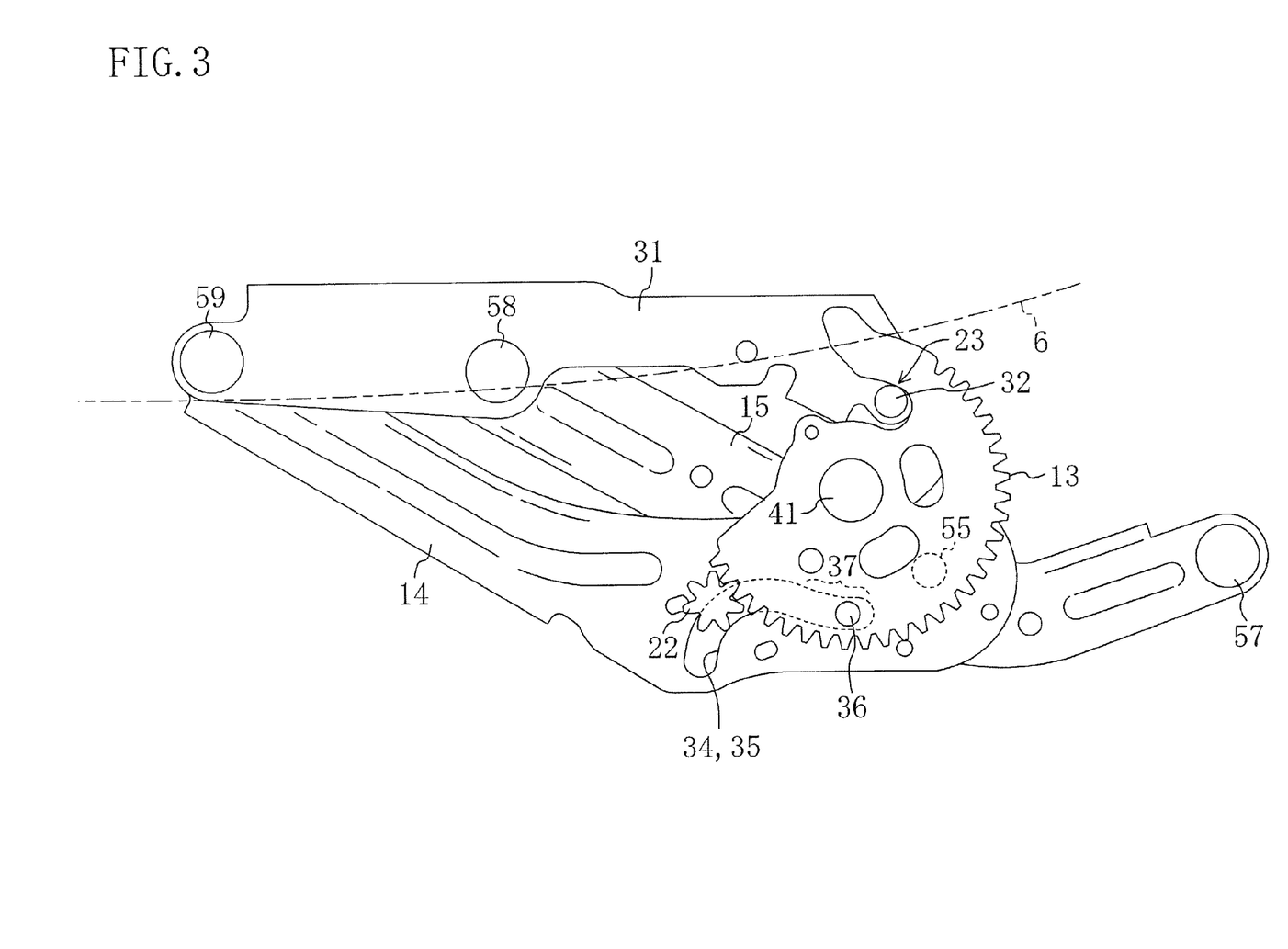
FIG. 3 Schematic side view of a link mechanism for opening/closing a lid when the lid is closed and locked.
Figure 4:
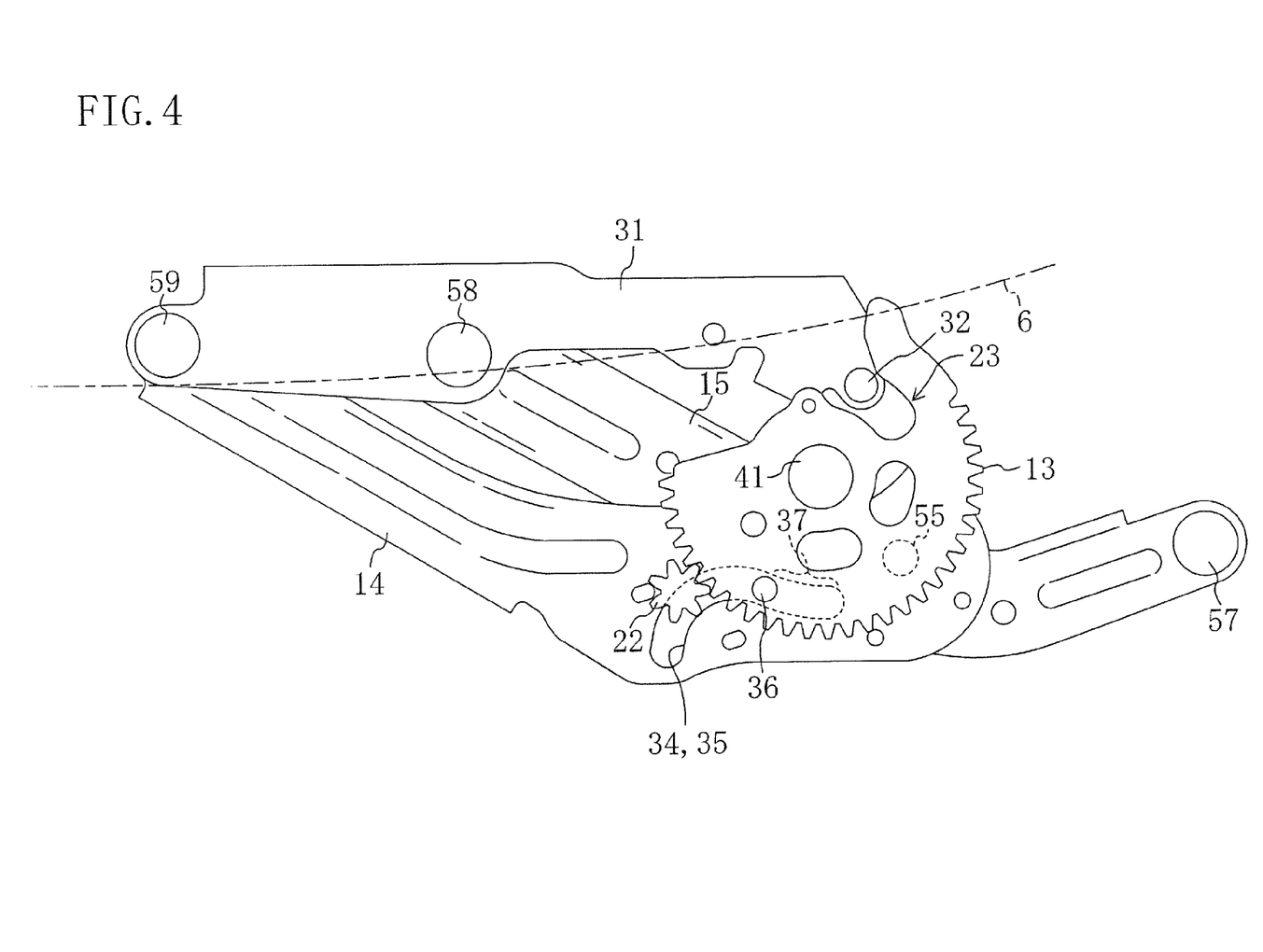
FIG. 4 Schematic side view of a link mechanism for opening/closing a lid when the lid is closed and unlocked.
Figure 5:
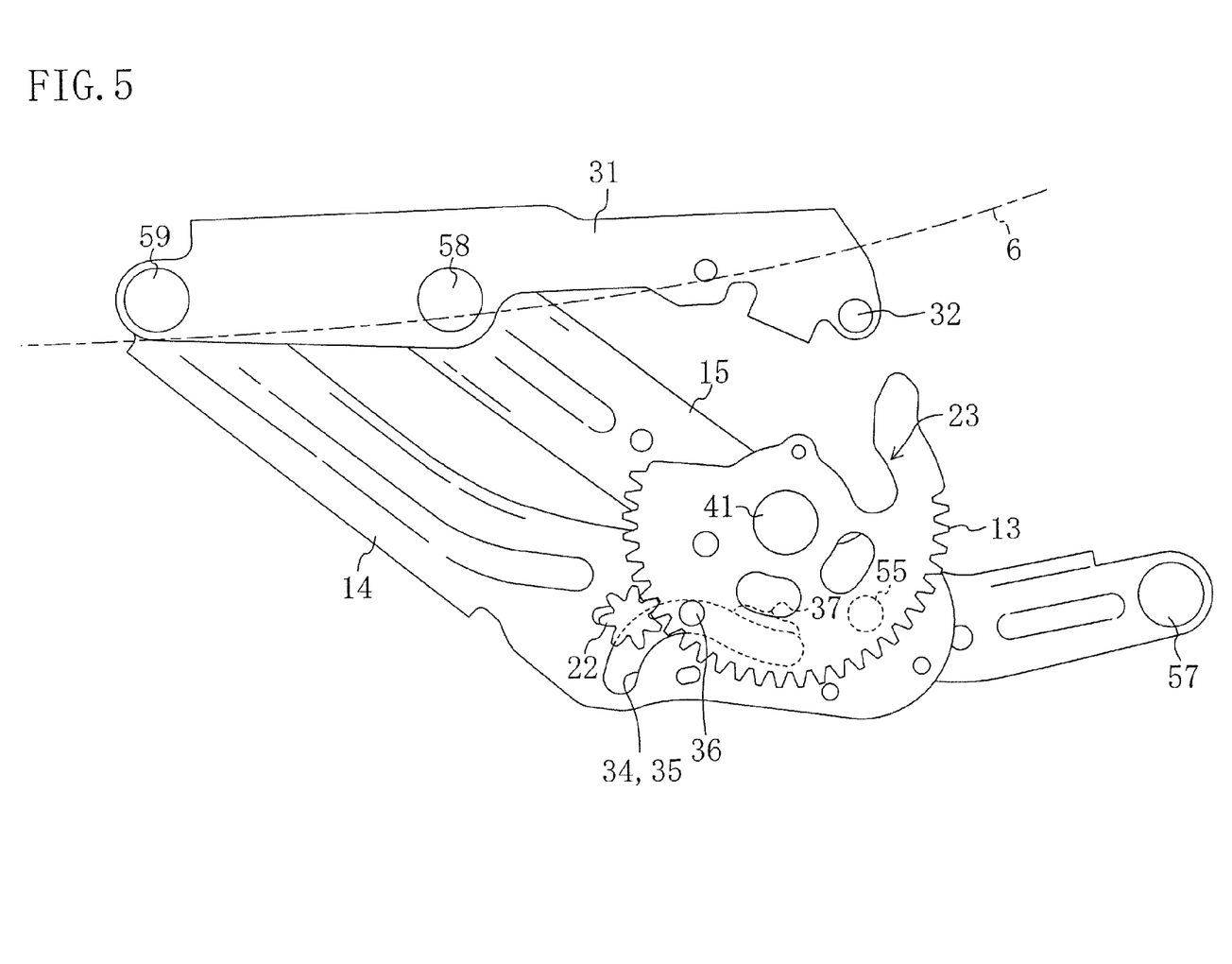
FIG. 5 Schematic side view of a link mechanism for opening/closing a lid when the lid starts to open.

FIGS. 3, 4 and 5 are views showing a link mechanism for opening and closing the lid 6 in an enlarged manner. FIG. 3 illustrates a state in which the lid 6 is closed and a hook portion 23 engages an engaging pin 32 to lock (latch) the lid 6. FIG. 4 illustrates a state in which the lid 6 is closed and the hook portion 23 and the engaging pin 32 are disengaged to unlock (unlatch) the lid 6. FIG. 5 illustrates a state in which the hook portion 23 and the engaging pin 32 are disengaged so that the lid 6 is slightly open. In these drawings, for simplicity in illustrating the link mechanism, the lid 6 is indicated by the dash-dotted line and the motor 12 and the main bracket 21 are omitted.

Figure 7:
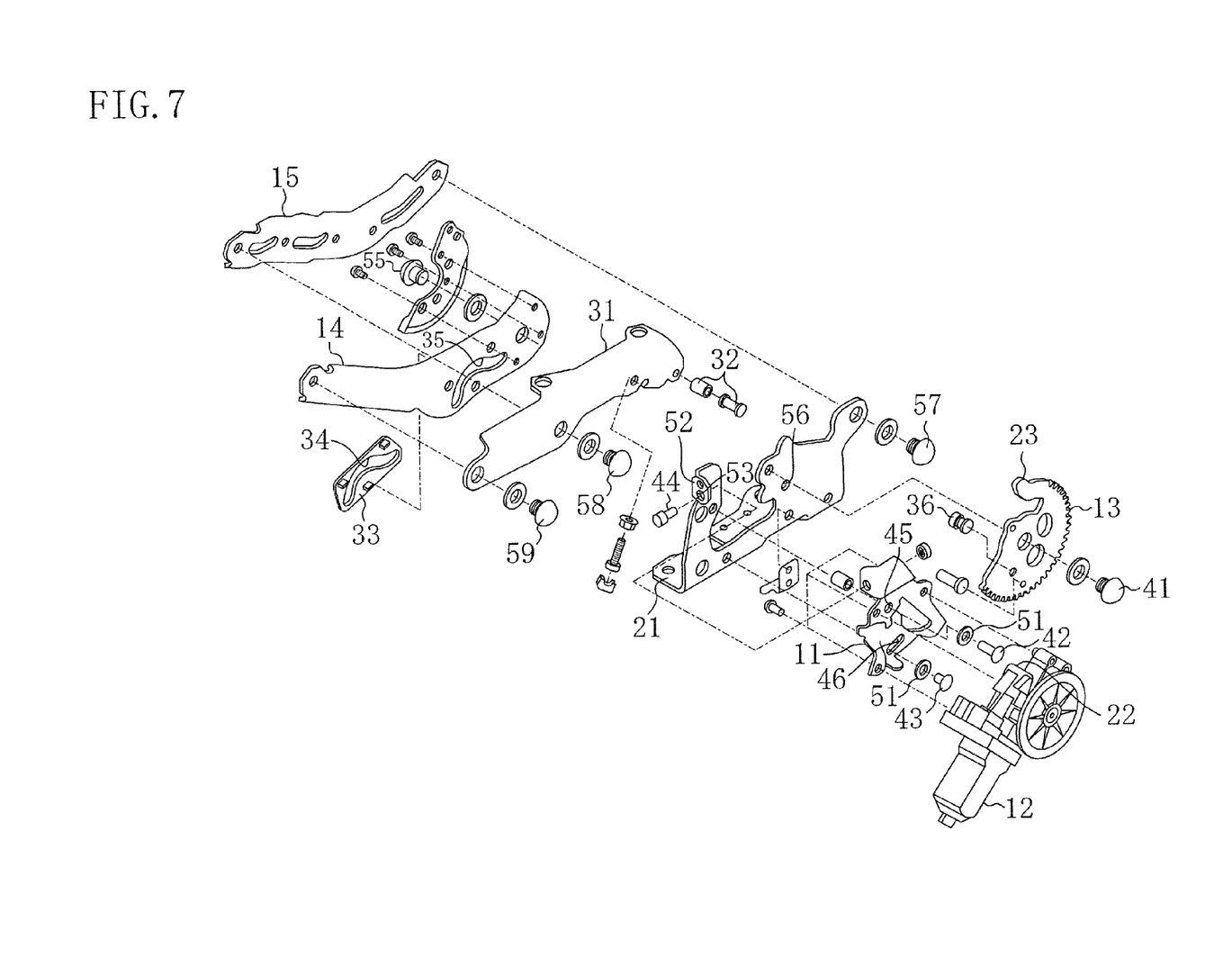
FIG. 7 Exploded view illustrating structural components of the link mechanism according to a first embodiment.

Now, a configuration of the link mechanism is more specifically described with reference mainly to FIG. 7 and also to FIGS. 3 through 6.

In this link mechanism, the driving lever 14 is driven by a sector gear 13. An elongated hole 34 in a cam 33 having an elongated hole (hereinafter, simply referred to as a cam 33) attached to the driving lever 14 accepts a driving pin 36 provided to the sector gear 13. The rotation of the sector gear 13 causes the driving pin 36 to move within the elongated hole 34 and exert a force on the inner wall of the elongated hole 34, thereby driving the driving lever 14. The driving lever 14 is also provided with an elongated hole 35 having the same shape as the elongated hole 34 in the cam 33. The sector gear 13 is pivotally connected to the main bracket 21 as a base with a sector-gear connecting bolt 41 and is driven by the motor 12 through a pinion 22 (hidden at the back of the motor 12 in FIG. 7). That is, the sector-gear connecting bolt 41 serves as a rotation axis of the sector gear 13. Driving of the driving lever 14 will be specifically described later.

The motor 12 is fixed to the motor bracket 11. The motor bracket 11 is attached to the main bracket 21 with two bolts 42, 43. The bolt 42 is inserted in a hole 45 in the motor bracket 11, the bolt 43 is inserted in an elongated hole 46 in the motor bracket 11, and these bolts 42, 43 are screwed into holes having internal threads in the main bracket 21 with washers 51 sandwiched between the bolts 42, 43 and the motor bracket 11. The main bracket 21 has a bent portion 52 bending substantially perpendicularly to the face at which the motor bracket 11 is attached. A bolt 44 is inserted in a fixing hole 53 in the bent portion 52 and is screwed into the motor bracket 11, thereby fixing the main bracket 21 to the motor bracket 11.

As illustrated in FIG. 3, while the lid 6 is closed, the hook portion 23 of the sector gear 13 engages the hook-engaging pin 32 in the lid bracket 31 fixed to the lid 6 so that the lid 6 is locked and does not open. The hook portion 23 is formed by making an end of the sector gear 13 in the form of a hook. The external periphery of the hook-shape recess portion of the hook portion 23 engaging the engaging pin 32 is part of an arc equidistant from the sector-gear connecting bolt 41, and the tip of the hook portion 23 outwardly extends so that the lock is opened.

Now, it is specifically described how the driving lever 14 is operated by the cam 33 and the sector gear 13.

The elongated hole 34 in the cam 33 and the elongated hole 35 in the driving lever 14 extend from one end to the other away from a pivotally-connecting bolt 55, which is a member for pivotally connecting the driving lever 14 to the main bracket 21. A non-driving section 37 is provided at an end of each of the elongated holes 34 and 35 closer to the pivotally-connecting bolt 55. As shown in FIGS. 3 and 4, the non-driving section 37 is generally parallel to a moving track of the driving pin 36 in the non-driving section 37. That is, when the driving pin 36 is present in the non-driving section 37, the non-driving section 37 forms an identical arc with respect to the sector-gear connecting bolt 41.

As described above, since the non-driving section 37 is generally parallel to the moving track of the driving pin 36, the movement of the driving pin 36 in the non-driving section 37 does not cause the driving pin 36 to exert a force on the cam 33 so that the driving lever 14 is not driven, i.e., the driving lever 14 is stopped during the movement. Specifically, while the driving pin 36 moves in the non-driving section 37, no force is applied to the driving lever 14 and only the sector gear 13 moves. During this, in the sector gear 13, the hook portion 23 as a part of the sector gear 13 engages the engaging pin 32 or the hook portion 23 is removed from engagement with the engaging pin 32. The rotation of the sector gear 13 in the counterclockwise direction in the drawings (i.e., rotation in one direction) drives the lid 6 from an open state to a closed state, and the hook portion 23 engages the engaging pin 32 in this rotation direction.

In this manner, in this embodiment, one motor 12 and the sector gear 13 are used for opening/closing operation of the lid 6. However, since the driving lever 14 is not driven when the mechanism for latching the lid 6 is operated to latch or unlatch the lid 6, the motor 12 does not need to perform two types of operation, i.e., driving and latching, at the same time. Thus, the advantage of reducing the load of the motor 12 is obtained. In addition, the sector gear 13 for driving the driving lever 14 also functions as a part of the latch mechanism. Thus, the number of components is reduced and the latch mechanism has a small footprint.

Then, after the driving pin 36 has passed through the non-driving section 37, the driving pin 36 exerts a force on the cam 33 to drive the driving lever 14, as shown in FIGS. 5 and 6. The distance between the driving pin 36 and the rotation center of the sector gear 13 is five to six times as large as the radius of the pinion 22. Accordingly, the driving torque of the driving pin 36 on the elongated holes 34 and 35 is five to six times as high as the torque of the motor 12. Thus, a low-torque motor is allowed to be used as the motor 12 and, as a result, cost reduction is achieved.

As the lid 6 is driven from the closed state to the open state, the position of the driving pin 36 in the elongated holes 34 and 35 moves away from the pivotally-connecting bolt 55 serving as the axis. Accordingly, as the lid 6 changes from the closed state to the open state, the force in driving the driving lever 14 increases so that opening/closing operation is smoothly performed without an increase in load of the motor 12.

The shapes of the elongated holes 34 and 35 are determined depending on how the opening/closing speed according to the position from the open state to the closed state of the lid 6 is set. Specifically, the opening/closing speed is preferably low at the start or end of the movement. Thus, as shown in FIGS. 4 and 6, portions of the elongated holes 34 and 35 around the position of the driving pin 36 at the start of movement from the fully-closed or fully-open state are generally in the form of an arc with respect to the rotation center of the sector gear 13.

As described above, in this embodiment, the elongated hole 34 in the cam 33 attached to the driving lever 14 accepts the driving pin 36, which exerts a force on the cam 33 to drive the driving lever 14. Accordingly, the movement, especially the speed variation, of the driving lever 14 is arbitrarily set by adjusting the position and shape of the elongated hole 34, thus allowing the opening/closing speed of the lid 6 in the middle of the opening/closing operation to be arbitrarily changed. In addition, in this embodiment, one motor 12 and the sector gear 13 continuously perform driving of the driving lever 14 and latching of the lid 6. Thus, a fully-closed state detecting sensor (a switch), which is needed in the case of using different mechanisms for driving and latching, is unnecessary, thus reducing the number of components. Moreover, no time lag arises between driving and latching, thus smoothly operating these operations.

Embodiment 2

A link mechanism according to a second embodiment is different from that of the first embodiment only in the absence of a cam 33. Specifically, in the link mechanism of the second embodiment, only an elongated hole 35 in a driving lever 14 accepts a driving pin 36 and the driving lever 14 is driven by the driving pin 36. In this embodiment, the thickness of the driving lever 14 needs to be larger than that in the first embodiment, for example, in order to increase the rigidity of the driving lever. The link mechanism of the second embodiment has the same advantages as those of the link mechanism of the first embodiment.

Embodiment 3

Figure 8:
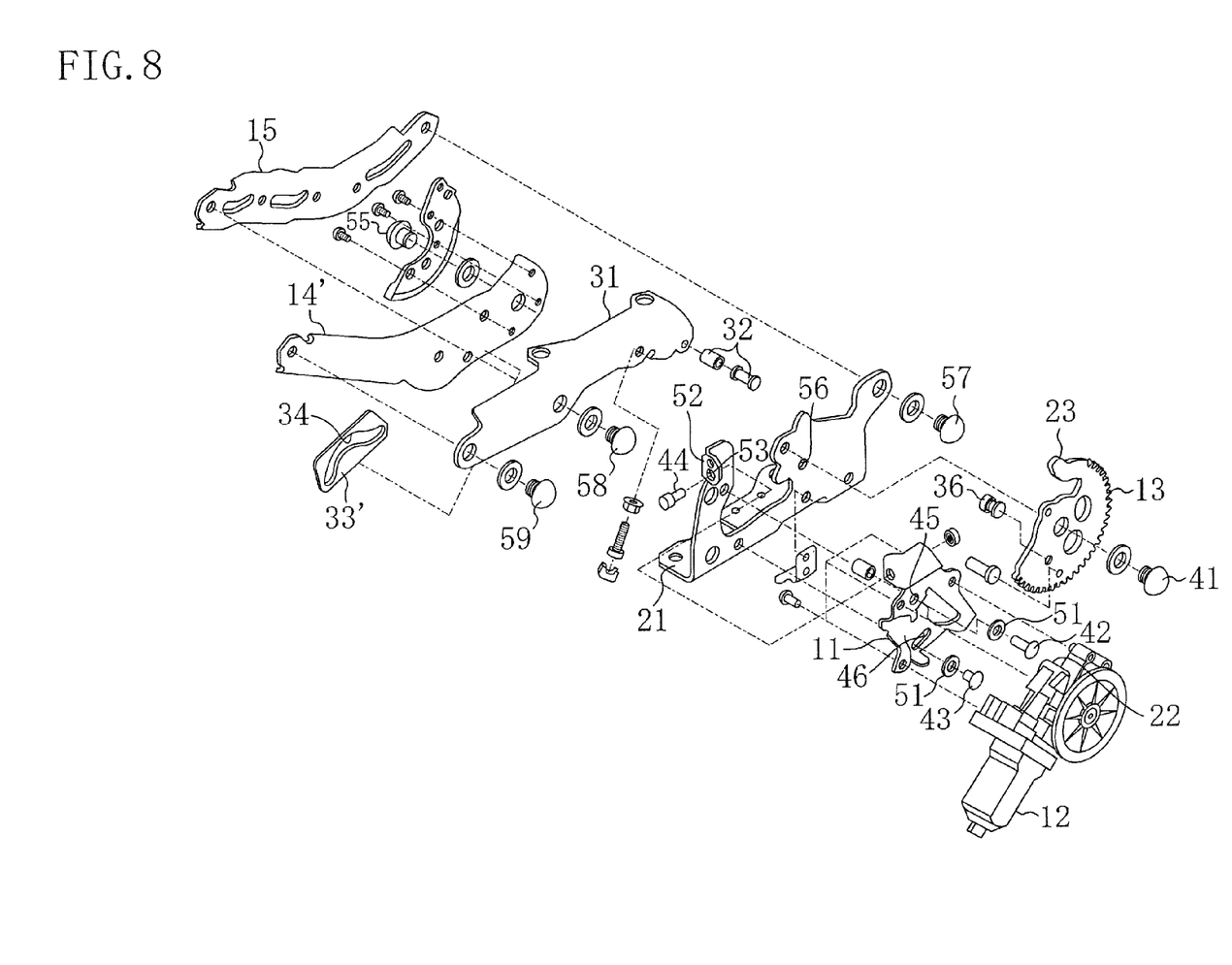
FIG. 8 Exploded view illustrating structural components of the link mechanism according to a third embodiment.

A link mechanism according to a third embodiment is different from that of the first embodiment only in that no elongated hole is provided in a driving lever 14' and a cam 33' having an elongated hole is attached to a face of the driving lever 14' opposite to the face thereof facing a sector gear 13, as shown in FIG. 8. Specifically, in the link mechanism of this embodiment, only an elongated hole 34 in the cam 33' accepts a driving pin 36 and the driving lever 14' is driven by the driving pin 36. The link mechanism of this embodiment has the same advantages as those of the link mechanism of the first embodiment.

Other Embodiments

The foregoing embodiments are only examples, and the present invention is not limited to these examples. For example, the positions of the elongated holes 34 and 35 in the driving lever 14 and the shapes thereof are not specifically limited as long as the distance from the elongated holes 34 and 35 to the sector-gear connecting bolt 41 is larger than the radius of the pinion 22 and the elongated holes 34 and 35 extend away from the pivotally-connecting bolt 55 for connecting the driving lever 14 to the main bracket 21.

The non-driving section 37 is not necessarily provided at a side associated with the closed state of the lid 6. The non-driving section 37 may be provided at a side associated with the fully-open state of the lid 6 or at both sides associated with the fully-open and fully-closed states of the lid 6. In such cases, a latch mechanism having a hook portion and an engaging pin at the fully-open side may be provided.

The driving pin 36 fitted into the elongated holes 34 and 35 may be in any form such as a simple projection as long as the driving pin 36 is provided to the sector gear 13 and fitted into the elongated holes 34 and 35 to drive the driving lever 14.

The latch mechanism for latching the lid 6 is not limited to the mechanism having the hook portion 23 and the engaging pin 32. The latch mechanism may be any mechanism as long as the lid 6 is latched by engagement and fitting, for example.

The driving pin 36 may be fitted into a groove. The elongated hole or groove accepting the driving pin 36 may be provided only in a cam attached to the driving lever 14 and may extend across the driving lever 14.

INDUSTRIAL APPLICABILITY

As described above, a link mechanism according to the present invention allows the speed of opening/closing a lid during the opening/closing operation to be changed, and thus is useful for apparatus for opening and closing a vehicle panel member, for example.

The invention claimed is:

1. A link mechanism for opening and closing a lid, comprising:
   a base;
   a driving lever and a coupled-driving lever, one end of each of the levers being pivotally connected to the base at a different position from each other; and
   a lid to which the other end of each of the levers is connected, wherein the driving lever is provided with a cam which has one of a groove and an elongated hole to accept a pin,
   the pin is provided to a gear which is driven by a motor through a pinion,
   a distance between the central axis of the gear and the pin is larger than the radius of the pinion, and
   the driving lever is driven by the pin which is configured to move in one of the groove and the elongated hole.

2. A link mechanism for opening and closing a lid, comprising:
   a base;
   a driving lever and a coupled-driving lever, one end of each of the levers being pivotally connected to the base at a different position from each other; and
   a lid to which the other end of each of the levers is connected,
   wherein the driving lever is provided with one of a groove and an elongated hole to accept a pin,
   the pin is provided to a gear which is driven by a motor through a pinion,
   a distance between the central axis of the gear and the pin is larger than the radius of the pinion, and
   the driving lever is driven by the pin which is configured to move in one of the groove and the elongated hole.

3. The link mechanism as described in claim 1, wherein one of the groove and the elongated hole is formed in a manner extending away from a portion of the driving lever at which the driving lever is pivotally connected to the base.

4. The link mechanism as described in claim 1, wherein one of the groove and the elongated hole has a non-driving section which is formed generally parallel to a moving track of the pin, and
   the driving lever is not driven even when the pin moves in the non-driving section.

5. The link mechanism as described in claim 1, wherein the non-driving section is provided at least at one end of one of the groove and the elongated hole, and
   when the pin is located in the non-driving section, the lid is kept in a closed state.

6. The link mechanism as described in claim 5, wherein the non-driving section is provided in one of the groove and the elongated hole at one end thereof located closer to a portion of the driving lever at which the driving lever is pivotally connected to the base.

7. The link mechanism as described in claim 5, wherein,
   the gear drives the lid from an open state to a closed state through rotation in one direction, and
   while the rotation in one direction of the gear causes the pin to move in the non-driving section provided at the end of one of the groove and the elongated hole, an engaging member provided to the gear engages an engagement-object member provided to the lid.

8. The link mechanism as described in claim 7, wherein the gear is a sector gear.

9. The link mechanism as described in claim 8, wherein the engaging member is an end portion of the sector gear which is formed in the shape of a hook.

10. The link mechanism as described in claim 6, wherein,
    the gear drives the lid from an open state to a closed state through rotation in one direction, and
    while the rotation in one direction of the gear causes the pin to move in the non-driving section provided at the end of one of the groove and the elongated hole, an engaging member provided to the gear engages an engagement-object member provided to the lid.

11. The link mechanism as described in claim 10, wherein the gear is a sector gear.

12. The link mechanism as described in claim 11, wherein the engaging member is an end portion of the sector gear which is formed in the shape of a hook.

13. The link mechanism as described in claim 2, wherein one of the groove and the elongated hole is formed in a manner extending away from a portion of the driving lever at which the driving lever is pivotally connected to the base.

14. The link mechanism as described in claim 2, wherein one of the groove and the elongated hole has a non-driving section which is formed generally parallel to a moving track of the pin, and
    the driving lever is not driven even when the pin moves in the non-driving section.

15. The link mechanism as described in claim 3, wherein one of the groove and the elongated hole has a non-driving section which is formed generally parallel to a moving track of the pin, and the driving lever is not driven even when the pin moves in the non-driving section.

16. The link mechanism as described in claim 2, wherein the non-driving section is provided at least at one end of one of the groove and the elongated hole, and when the pin is located in the non-driving section, the lid is kept in a closed state.

17. The link mechanism as described in claim 16, wherein the non-driving section is provided in one of the groove and the elongated hole at one end thereof located closer to a portion of the driving lever at which the driving lever is pivotally connected to the base.

18. The link mechanism as described in claim 16, wherein, the gear drives the lid from an open state to a closed state through rotation in one direction, and while the rotation in one direction of the gear causes the pin to move in the non-driving section provided at the end of one of the groove and the elongated hole, an engaging member provided to the gear engages an engagement-object member provided to the lid.

19. The link mechanism as described in claim 18, wherein the gear is a sector gear.

20. The link mechanism as described in claim 19, wherein the engaging member is an end portion of the sector gear which is formed in the shape of a hook.

21. The link mechanism as described in claim 17, wherein, the gear drives the lid from an open state to a closed state through rotation in one direction, and while the rotation in one direction of the gear causes the pin to move in the non-driving section provided at the end of one of the groove and the elongated hole, an engaging member provided to the gear engages an engagement-object member provided to the lid.

22. The link mechanism as described in claim 21, wherein the gear is a sector gear.

23. The link mechanism as described in claim 22, wherein the engaging member is an end portion of the sector gear which is formed in the shape of a hook.

* * * * *